(12) United States Patent
Acar et al.

(10) Patent No.: US 11,327,825 B2
(45) Date of Patent: *May 10, 2022

(54) PREDICTIVE ANALYTICS FOR FAILURE DETECTION

(71) Applicant: INTERNATIONAL BUSINESS MACHINES CORPORATION, Armonk, NY (US)

(72) Inventors: Emrah Acar, Montvale, NJ (US); Gradus Janssen, Putnam Valley, NY (US); Rajiv V. Joshi, Yorktown Heights, NY (US); Tong Li, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/804,545

(22) Filed: Nov. 6, 2017

(65) Prior Publication Data
US 2018/0197092 A1    Jul. 12, 2018

Related U.S. Application Data

(63) Continuation of application No. 15/403,820, filed on Jan. 11, 2017.

(51) Int. Cl.
*G06N 20/00* (2019.01)
*G06F 11/07* (2006.01)
*G05B 19/418* (2006.01)

(52) U.S. Cl.
CPC ...... *G06F 11/079* (2013.01); *G05B 19/41875* (2013.01); *G06N 20/00* (2019.01); *G05B 2219/32077* (2013.01)

(58) Field of Classification Search
CPC .......... G06N 5/04; G06N 20/00; G06N 5/003; G05B 19/41875; G05B 2219/32077; G06F 11/00
See application file for complete search history.

(56) References Cited

U.S. PATENT DOCUMENTS

2007/0220455 A1*  9/2007  Joshi ................ G11C 29/56004
                                                                716/56
2011/0153272 A1*  6/2011  Tiwary ............... G01R 31/2894
                                                                702/181

(Continued)

OTHER PUBLICATIONS

He et al., "Fault Detection using the k-Nearest Neighbor Rule for Semiconductor Manufacturing Processes," pp. 345-354 (IEEE Transactions on Semiconductor Manufacturing 2007) (Year: 2007).*

(Continued)

*Primary Examiner* — Kakali Chaki
*Assistant Examiner* — Kevin L. Smith
(74) *Attorney, Agent, or Firm* — Tutunjian & Bitetto, P.C.; Daniel Morris

(57) ABSTRACT

A computer-implemented method and computing system are provided for failure prediction of a batch of manufactured objects. The method includes classifying, by a processor using a simulation, a set of samples with uniformly distributed parameter values, to generate sample classifications for the batch of manufactured objects. The method further includes determining, by the processor, a centroid of failing ones of the samples in the set, based on the sample classifications. The method also includes generating, by the processor, a new set of samples with a distribution around the centroid of the failing ones of the sample in the set. The method additionally includes populating, by the processor, a nearest neighbor vector space using the new set of samples. The method further includes classifying, by the processor, the new set of samples by performing a nearest neighbor (Continued)

search on the nearest neighbor vector space using a distance metric.

9 Claims, 6 Drawing Sheets

(56) References Cited

U.S. PATENT DOCUMENTS

| | | | | |
|---|---|---|---|---|
| 2012/0046929 A1* | 2/2012 | Joshi | ............ | G06F 17/5022 |
| | | | | 703/13 |
| 2013/0159947 A1* | 6/2013 | Gattiker | ............ | G06F 17/5036 |
| | | | | 716/107 |
| 2015/0110352 A1* | 4/2015 | Csefalvay | ............ | G06V 40/161 |
| | | | | 382/103 |
| 2016/0180248 A1* | 6/2016 | Regan | ............ | G09B 5/00 |
| | | | | 706/12 |
| 2016/0189055 A1* | 6/2016 | Zvitia | ............ | G05B 19/41875 |
| | | | | 706/11 |
| 2016/0253466 A1* | 9/2016 | Agaian | ............ | G06T 7/246 |
| | | | | 382/128 |
| 2017/0109646 A1* | 4/2017 | David | ............ | H01L 22/12 |
| 2018/0074124 A1* | 3/2018 | Xu | ............ | G01R 31/31937 |

OTHER PUBLICATIONS

Joshi et al., "The Dawn of Predictive Chip Yield Design: Along and Beyond the Memory Lane," pp. 36-45 (IEEE Design & Test of Computers, 2010) (Year: 2010).*
Dudani, "The Distance-Weighted k-Nearest-Neighbor Rule," IEEE Transactions on Systems, Man, and Cybernetics (1976) (Year: 1976).*
Haq et al., "Virtual Metrology Concept for Predicting Defect Levels in Semiconductor Manufacturing," CIRP 57 (2016) (Year: 2016).*
Maurya et al., "Bayesian Optimization for Predicting Rare Internal Failures in Manufacturing Processes," IEEE International Conference on Big Data (2016) (Year: 2016).*
The Authoritative Dictionary of IEEE Standards Terms, at p. 1054 7th Ed (2000) (Year: 2000).*
Vincent et al., "K-Local Hyperplane and Convex Distance Nearest Neighbor Algorithms," Universite de Montreal (2001) (Year: 2001).*

* cited by examiner

PREDICTIVE ANALYTICS FOR FAILURE DETECTION

BACKGROUND

Technical Field

The present invention relates generally to information processing and, in particular, to predictive analytics for failure detection.

Description of the Related Art

Statistical yield calculation is useful in many applications such as failure detection. However, current solutions for statistical yield calculation do not scale well for problems that include many parameters (e.g., in the hundreds or more) and hence sampling in dimensions of the many variables. Thus, there is a need for an improved statistical yield calculation approach for failure detection.

SUMMARY

According to an aspect of the present invention, a computer-implemented method is provided for failure prediction of a batch of manufactured objects. The method includes classifying, by a processor using a simulation, a set of samples with uniformly distributed parameter values, to generate sample classifications for the batch of manufactured objects. The method further includes determining, by the processor, a centroid of failing ones of the samples in the set, based on the sample classifications. The method also includes generating, by the processor, a new set of samples with a distribution around the centroid of the failing ones of the sample in the set. The method additionally includes populating, by the processor, a nearest neighbor vector space using the new set of samples. The method further includes classifying, by the processor, the new set of samples by performing a nearest neighbor search on the nearest neighbor vector space using a distance metric.

According to another aspect of the present invention, a computer program product is provided for failure prediction of a batch of manufactured objects. The computer program product includes a computer readable storage medium having program instructions embodied therewith. The program instructions are executable by a computer to cause the computer to perform a method. The method includes classifying, by a processor using a simulation, a set of samples with uniformly distributed parameter values, to generate sample classifications for the batch of manufactured objects. The method further includes determining, by the processor, a centroid of failing ones of the samples in the set, based on the sample classifications. The method also includes generating, by the processor, a new set of samples with a distribution around the centroid of the failing ones of the sample in the set. The method additionally includes populating, by the processor, a nearest neighbor vector space using the new set of samples. The method further includes classifying, by the processor, the new set of samples by performing a nearest neighbor search on the nearest neighbor vector space using a distance metric.

According to yet another aspect of the present invention, a computing system is provided. The computing system includes a processor and a memory operably coupled to the processor, configured to classify, using a simulation, a set of samples with uniformly distributed parameter values, to generate sample classifications for a batch of manufactured objects. The processor and the memory are further configured to determine a centroid of failing ones of the samples in the set, based on the sample classifications. The processor and the memory are also configured to generate a new set of samples with a distribution around the centroid of the failing ones of the sample in the set. The processor and the memory are additionally configured to populate a nearest neighbor vector space using the new set of samples. The processor and the memory are further configured to classify the new set of samples by performing a nearest neighbor search on the nearest neighbor vector space using a distance metric.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

The present invention is directed to predictive analytics for failure detection. The predictive analytics for failure detection can involve statistical yield calculation. In an embodiment, the statistical yield calculation is performed by mixed importance sampling boosted with nearest neighbor based filtering. Moreover, the present invention can employ predictive analytics for failure detection. The preceding and other useful types of information can be provided by the present invention in order to detect potential failures in a product and thus avoid costly curative actions (e.g., recalls, etc.) that could result if a potential failure went undetected.

In an embodiment, the present invention combines an existing sampling method with sample filtering based on a nearest neighbor search. The resultant combination results in less samples needed for a given accuracy, or better accuracy with the same number of samples. Any of the preceding can be targeted, depending upon the application.

In an embodiment, the nearest neighbor filter works by classifying an unknown sample without the need for a time-consuming simulation run.

The present invention is able to deal with the expected increase of parameter space such that, for example, more refined models with hundreds of parameters can now be analyzed in a reasonable time.

In an embodiment, samples are generated and classified using, for example, an existing process. This set of so-called evaluated samples can be converted into a data structure suitable for nearest neighbor search. Typically, some form of tree is constructed that allows for average-case logarithmic search times. Then, new samples are composed whose classification is as yet unknown. Such an unclassified sample is submitted to a nearest neighbor search and all k neighbors thus found are consulted in order to determine the classification of the target sample. In case k=1, the target sample simply inherits the classification of its nearest neighbor. Other k values of interest can be odd such that ties are avoided. A rule for some odd value of k could be to let the majority of the neighbor classification determine the classification of the target sample. Other, more refined, rules are easily conceived of and used in accordance with the teachings of the present invention, while maintaining the spirit of the present invention. Thirdly, all samples, both evaluation set and the samples classified via nearest neighbor are now used to determine the overall performance of the memory cell.

Figure 1:
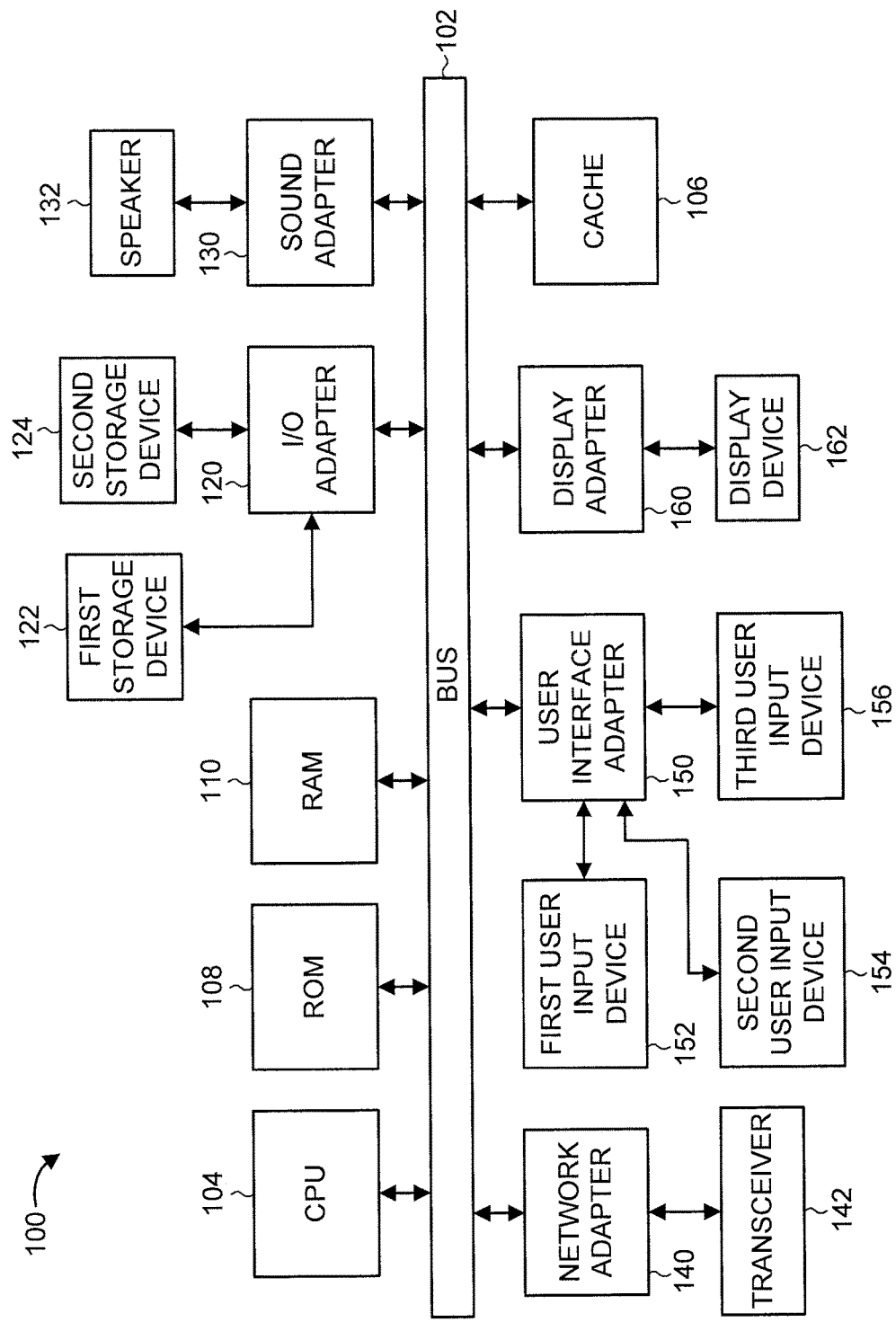
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
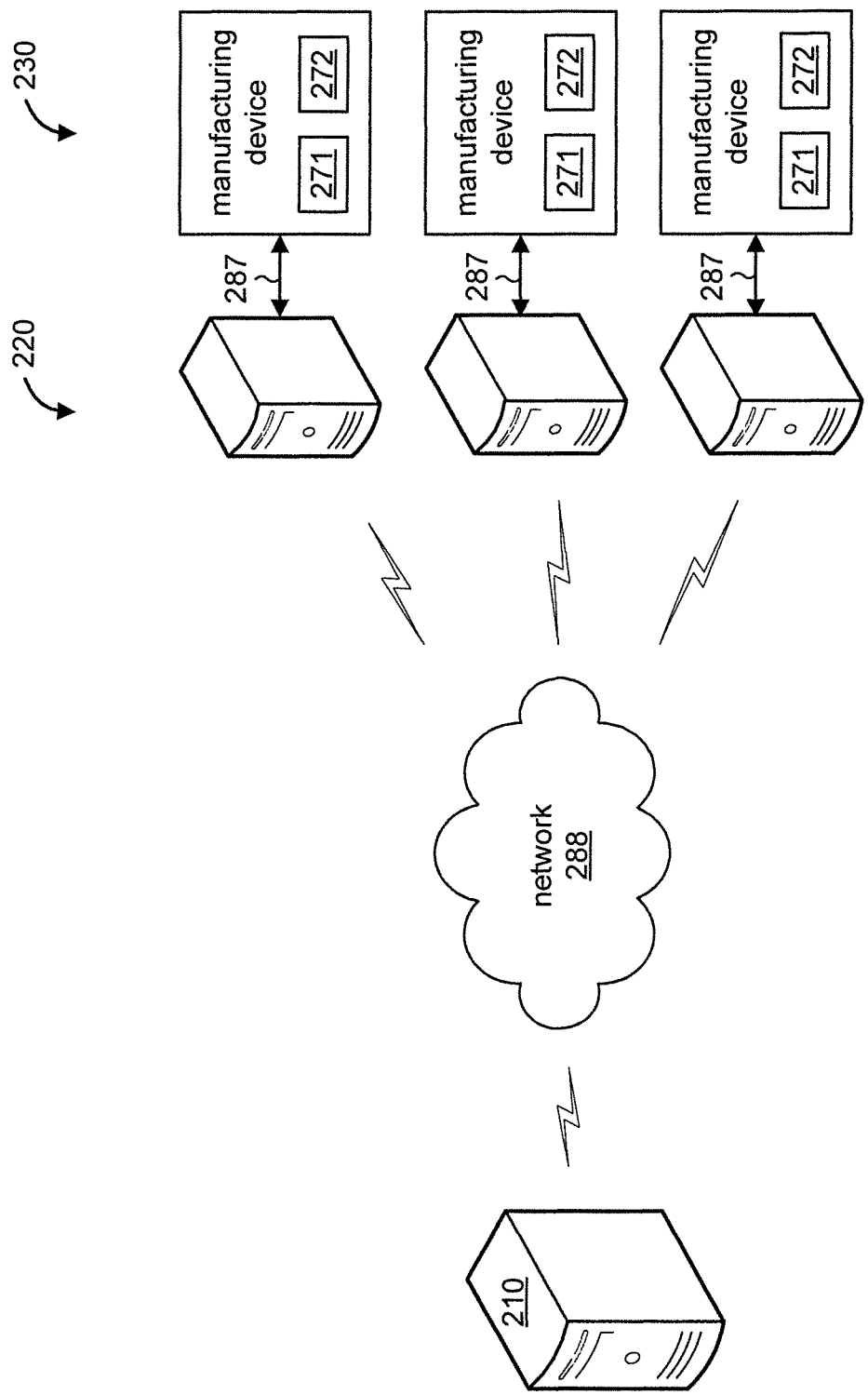
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
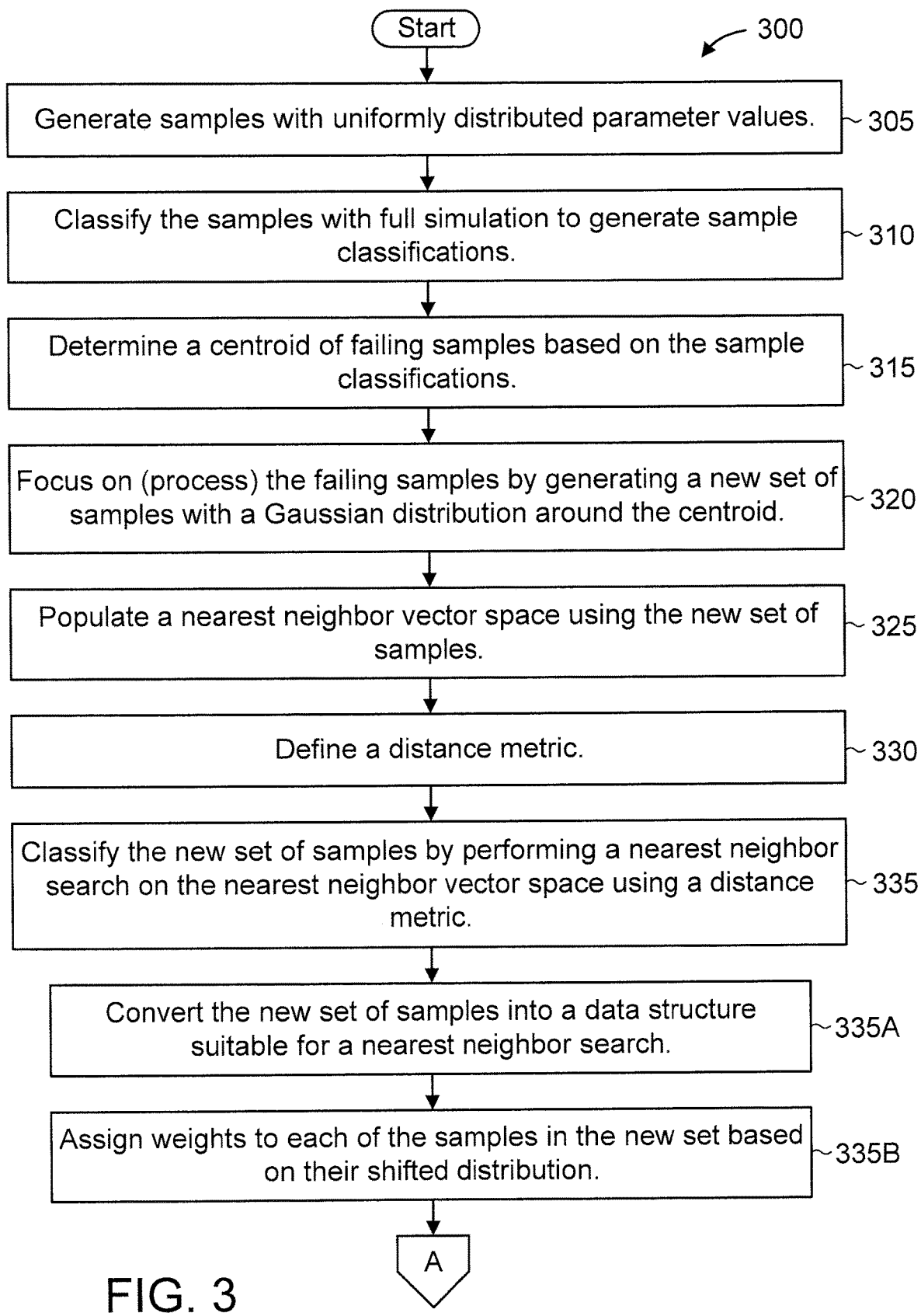
FIGS. 3-4 show an exemplary method for statistical yield calculation by mixed importance sampling boosted with nearest neighbor based filtering, in accordance with an embodiment of the present invention.
Figure 4:
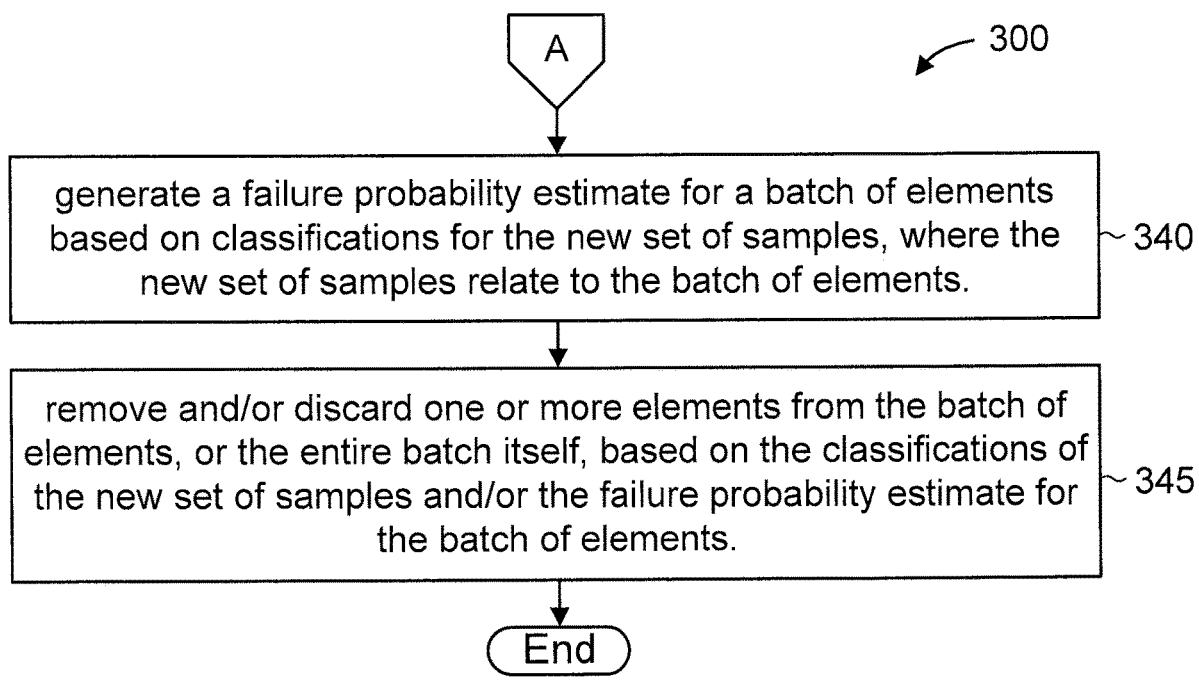

Further, it is to be appreciated that processing system 100 may perform at least part of the method described herein including, for example, at least part of method 300 of FIGS. 3-4. Similarly, part or all of environment 200 may be used to perform at least part of method 300 of FIGS. 3-4.

FIG. 2 shows an exemplary environment 200 to which the present invention can be applied, in accordance with an embodiment of the present invention.

The environment 200 includes a computing device 210. The environment 200 further includes a set of computing devices collectively and individually denoted by the figure reference numeral 220. The environment 200 also includes a set of manufacturing devices 230, each operably coupled to one of the computer devices in the set 220.

In an embodiment, the set of manufacturing devices 230 include integrated circuit (IC) manufacturing devices for the sake of illustration. However, it is to be appreciated that the manufacturing devices 230 are not limited to manufacturing ICs as the present invention can be applied to any manufactured object. In an embodiment, one or more of the manufacturing devices 230 can be part of an assembly line(s). Each of the manufacturing devices 230 can include an acceptance mechanism 271 and a rejection mechanism. The acceptance mechanism 271 can be a mechanism that furthers production of a manufactured device(s) deemed to have a pass classification in accordance with the present invention. For example, the acceptance mechanism 271 can pass a manufactured object to a next part/stage in a manufacturing cycle. In contrast, the rejection mechanism 272 can be a mechanism that halts production of a manufactured device(s) deemed to have a fail classification in accordance with the present invention. For example, the rejection mechanism 272 can involve a marking system to mark a manufactured object(s) with a fail label, and/or can involve removing a manufactured object(s) from an assembly line, and/or can involve discarding the manufactured object(s) for disposal. These and other implementations of acceptance mechanism 271 and rejection mechanism 272 are readily contemplated by one of ordinary skill in the art given the teachings of the present invention provided herein, while maintaining the spirit of the present invention.

Each of the computing devices 220 is operably coupled to one of the manufacturing devices 230 in order to control the manufacturing process and extract information relating to the resultant manufactured items. The extracted information can then be provided to computing device 210 for analysis such as, for example, statistical yield calculation. In this way, a centralized device, namely computing device 210, can be used to manage statistical yield calculation and corresponding responses in accordance with the present invention.

The computing device 210 is configured to implement the present invention, namely to perform statistical yield calculation by mixed importance sampling boosted with nearest neighbor based filtering. The set of computing devices 220 interact with computing device 210 in order to obtain results and so forth relating to the present invention. It is to be appreciated that the computing device 210 and the computing devices in the set 220 can be any type of computing device, including. For the sake of illustration, computing device 210 is implemented herein by a server, as well as each of computing devices 220, with each of the devices 210 and 220 interchangeably referred to herein as such (server).

Communications between the computing device 210 and the computing devices 220 can occur over one or more wired communications networks/arrangements and/or one or more wireless networks. For the sake of illustration, in the embodiment of FIG. 2, one or more wireless networks 288 are used to connect the computing device 210 to the computing devices 220. The one or more wireless networks 288 can involve any type of wireless communication technology.

Communications between the computing devices 220 and the manufacturing devices 230 can occur over one or more wired communications networks/arrangements and/or one or more wireless networks. For the sake of illustration, a wired communication arrangement 287 is used to connect the computing devices 220 to the manufacturing devices 230. The wired communication arrangement 287 can involve any type of wired communication technology.

While certain types of communication technologies are described between the elements of FIG. 2 for the sake of illustration, it is to be appreciated that any type of communication technology can be used including combinations of more than one, while maintaining the spirit of the present invention. For example, any type of networks such as, for example, but not limited to, cellular networks, local area networks, wide area networks, personal area networks, wireless networks, wired networks, any combination of the preceding, and so forth can be used. These and other variations of the elements of FIG. 2 are readily contemplated by one of ordinary skill in the art, while maintaining the spirit of the present invention.

The computing device 210 can perform any process/application involving statistical yield calculation by mixed importance sampling boosted with nearest neighbor based filtering. In this way, failures in a batch of elements such as integrated circuits can be addressed (for example, by discarding the batch or portions of the batch, and so forth).

Thus, given a set of unlabeled samples, the present invention can evaluate the same against a prior set of labeled samples without having to perform an expensive performance metric calculation. Such labelling can involve pass and fail classifications, in order to affect some yield strategy. These and other applications to which the present invention can be applied are readily determined by one of ordinary skill in the art, given the teachings of the present invention provided herein, while maintaining the spirit of the present invention.

Figure 5:
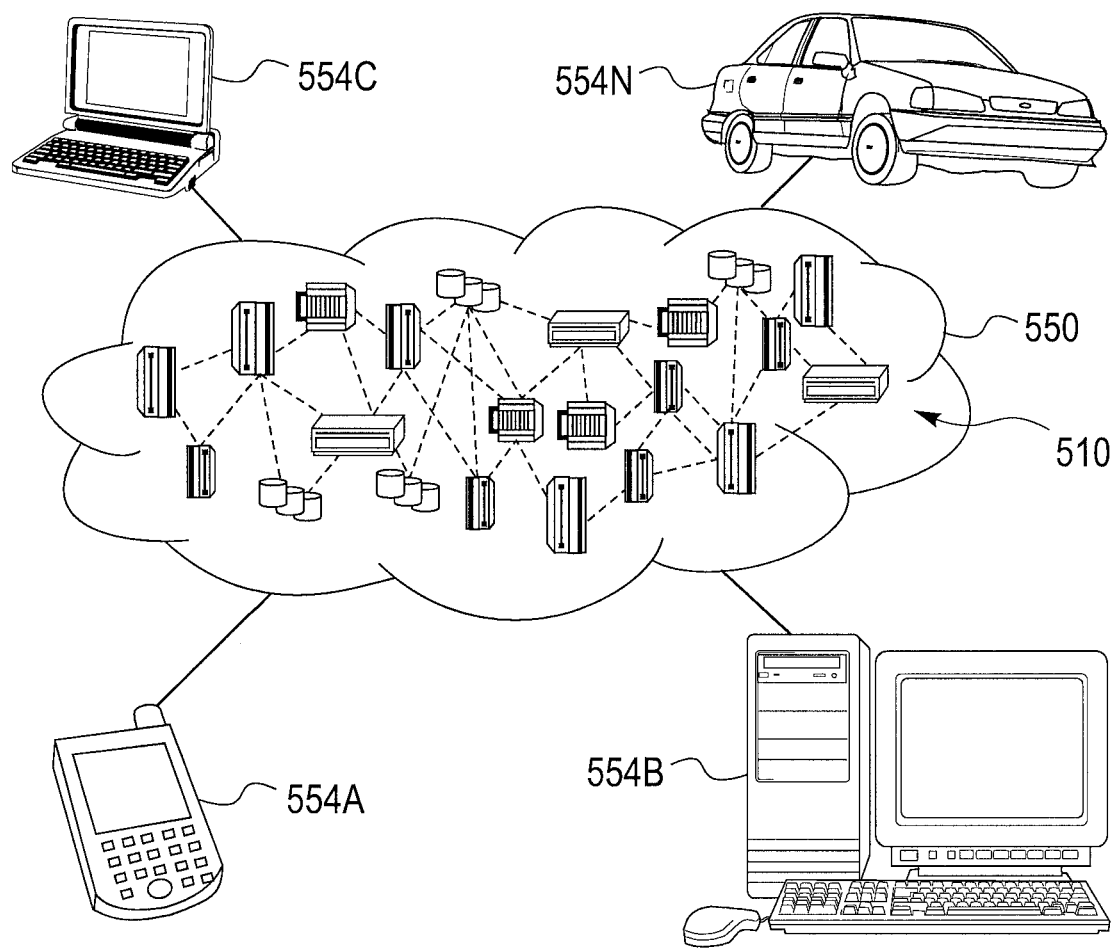
FIG. 5 shows an exemplary cloud computing environment, in accordance with an embodiment of the present invention.

It is to be appreciated that one or more elements of environment 200 can be implemented using a cloud configuration (see, e.g., FIGS. 4 and 5). Moreover, one or more elements in FIG. 2 can be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

A description will now be given regarding statistical yield calculation, in accordance with an embodiment of the present invention. The description will be followed by a detailed method set forth and described with respect to FIG. 3.

Regarding statistical yield calculation, a sample is processed to calculate a certain performance metric that is compared against an a-priori established critical value. When the performance metric is better (less) than a critical (threshold) value, the sample is marked "pass". In contrast, when the performance metric is worse (greater than or equal to) than the critical (threshold) value, the sample is marked "fail". The failure probability is estimated as the ratio of the number of failing samples and their total number. The ultimate goal of sampling is to obtain a "picture" of the good (passing) and bad (failing) hyper-regions in the multi-dimensional parameter space and to exploit that knowledge to zoom in on the typically rare and very small failure regions. Each sample brings with it a certain amount of computation. It is therefore prudent to keep the number of samples small. The present invention can classify new samples without having to suffer the performance metric computation.

FIGS. 3-4 show an exemplary method 300 for statistical yield calculation by mixed importance sampling boosted with nearest neighbor based filtering, in accordance with an embodiment of the present invention.

At step 305, generate samples with uniformly distributed parameter values for a batch of manufactured objects. In an embodiment, the samples can be generated as vectors, or in some other form. The manufactured objects can be, for example, but are not limited to, integrated circuits and so forth. The integrated circuits can be, for example, memories, processors, and so forth. As appreciated by one of ordinary skill in the art given the teachings of the present invention provided herein, the present invention can be applied to any type of manufactured object.

At step 310, classify the samples with full simulation to generate sample classifications. In an embodiment, the simulation is a full simulation. In an embodiment, PowerSpice can be used to perform the simulation. Of course, other simulators can also be used.

At step 315, determine a centroid of failing samples based on the sample classifications. In an embodiment, the centroid is determined as the geometric mean of the failing samples, based on the sample classifications.

At step 320, focus on (process) the failing samples by generating a new set of samples with a distribution around the centroid. In an embodiment, a Gaussian distributed is used. However, it is to be appreciated that the present invention is not limited to Gaussian distributions and, thus, other distributions can also be used in accordance with the teachings of the present invention, while maintaining the spirit of the present invention. For example, any of an asymmetrical distribution, a Weibull distribution, and so forth can be used.

At step 325, populate a nearest neighbor vector space using the new set of samples.

At step 330, define a distance metric. For example, in an embodiment, Euclidian distance can be used. However, it is to be appreciated that other distance metrics such as Hamming distance and so forth can also be used in accordance with the teachings of the present invention, while maintaining the spirit of the present invention.

At step 335, classify the new set of samples by performing a nearest neighbor search on the nearest neighbor vector space using a distance metric.

In an embodiment, step 335 can include at least one of step 335A and 335B.

At step 335A, convert the new set of samples into a data structure suitable for a nearest neighbor search. For example, some form of tree structure can be constructed that allows for average-case logarithmic search times.

At step 335B, assign weights to each of the samples in the new set based on their shifted distribution. In an embodiment, the distance metric can be used to weigh the respective contributions of the samples. For example, a weight of 1/d (or some other relationship with respect to d) can be assigned to each sample, where d is the distance of that sample to the centroid.

In an embodiment, step 335 is performed as follows:
with k=1, inherit the pass/fail classification of the retrieved sample; and
with k odd and >1, use a voting mechanism (e.g., but not limited to, majority).

Further regarding step 335, while a majority voting mechanism is described for the sake of illustration when k has an odd value greater than 1, it is to be appreciated that the present invention is not limited to the same and can, thus, use other voting mechanisms, as readily appreciated by one of ordinary skill in the art, given the teachings of the present invention provided herein, while maintaining the spirit of the present invention.

Additionally regarding step 335, the resultant classification enables classifying an unlabeled vector (unlabeled sample from the new set of samples, also referred to as a query point or test point) by assigning a label to the query point which is most frequent among the k-nearest training samples nearest to that query point.

At step 340, generate a failure probability estimate for the batch of manufactured objects based on classifications for the new set of samples, where the new set of samples relate to the batch of manufactured objects.

At step 345, remove and/or discard one or more elements from the batch of elements, or the entire batch itself, based on the classifications of the new set of samples and/or the failure probability estimate for the batch of elements.

The present invention blends a few statistical techniques in filtering and enhancing sampling quality for more accurate and confident predictions of failures and prediction probabilities. In an embodiment, the present invention uses mixed importance sampling to reduce the variation of the outcome and prediction of failure by shifting the sampling location to where it may have more chance to fail. With that, the present invention assigns weights of each sampling accordingly with respect to their shifted distribution. Furthermore, the present invention employs an efficient and robust classifier to successively build a nearest-neighbor oriented classifier to quickly guess whether the new samples that are to be explored have any potential of returning importance sources of information.

By deployment of these two advanced statistical methods, the probability of failures (rare probability) is more confidently estimated with lower variance further reducing the needed samples for a desired level of accuracy.

The present invention avoids extraneous, superfluous sample processing by applying a nearest-neighbor search as an oracle that classifies a sample as pass or fail without doing an expensive performance metric calculation.

The beneficial effects of using a nearest neighbor approach are based on the assumption that samples (represented as parameter value vectors in some multi-dimensional vector space) strongly correlate in their failure classification when they are close. Closeness is defined with reference to some distance metric over the vector space. Empirical evidence suggests that this is indeed the case.

Finding nearest neighbors in a metric space as a pre-classifier for failure samples is a novel technique. The nearest neighbors (NN) algorithm solves the problem of finding points in space nearest to a given point. In an embodiment, the NN-space is the parameter samples' space and the distance metric can be freely chosen. For example, the Euclidean distance can be chosen between two parameter vectors. As the given point, we choose a sample for which its classification pass or fail is already determined, for example, by a simulation method. In general, the nearest neighbor algorithm is parametrized by the number of k neighbors in its solution set. The application of nearest neighbors to sample classification is interchangeably referred to herein as "sample filtering". The fewer samples that need to be considered the better, as readily appreciated by one of ordinary skill in the art. During sample filtering, the value of k can be varied to obtain multiple approximately close samples. Even for k=1 the new method is shown to be beneficial.

A description will now be given regarding a nearest neighbor filtering, in accordance with one or more embodiments of the present invention.

In an embodiment, the nearest neighbor filtering operates on labeled data (x, y), where X denotes a parameter vector, and Y denotes a label (0/1 for pass/fail).

In an embodiment, the nearest neighbor filtering involves collecting a set of (x, y), and using NN-based classifiers to predict whether or not the new sample xnew will return a new output ynew. For example, predict ynew as the label of nearest NN, predict based on the nearest neighbor's label. Or predict ynew as the majority label of k nearest neighbors. Or predict ynew as a fail if any of the k-nearest neighbors are a fail. Of course, other prediction basis are possible, while maintaining the spirit of the present invention.

A description will now be given regarding a k-NN classifier, in accordance with one or more embodiments of the present invention.

The k-NN classifier can be built at any stage in the sampling/experiment. For example, the k-NN classifier can be built using mixed importance sampling at stage 1 or mid-stage 2.

The k-NN classifier can be adjusted by the new samples dynamically (rebuilt). The k-NN classifier does not need to be exact, and can also use approximate nearest neighbor algorithms.

These algorithms will check the new labeled samples from the training database created by first set of unfiltered samples (e.g. 500). A failure region is marked through the important sampling simulations.

As an example, 500 filter samples can be used. These will sample stage 2 of MixIS until 500 samples have been obtained the usual way. This process can be done for the first step (which involves uniform sampling) or the second step (which involves shifted distribution) or for both in a MixIS process. Then, later samples generated beyond 500 will be checked with center of gravity based on the selected k value. For example, if k=1, the present invention will check one nearest neighbor. If k=3, the present invention will check three nearest neighbors. Normally k equal an odd valued integer in order to avoid a tie.

The upper and lower bound sigma values are based on 1 sigma and the other one with 2 sigma values.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
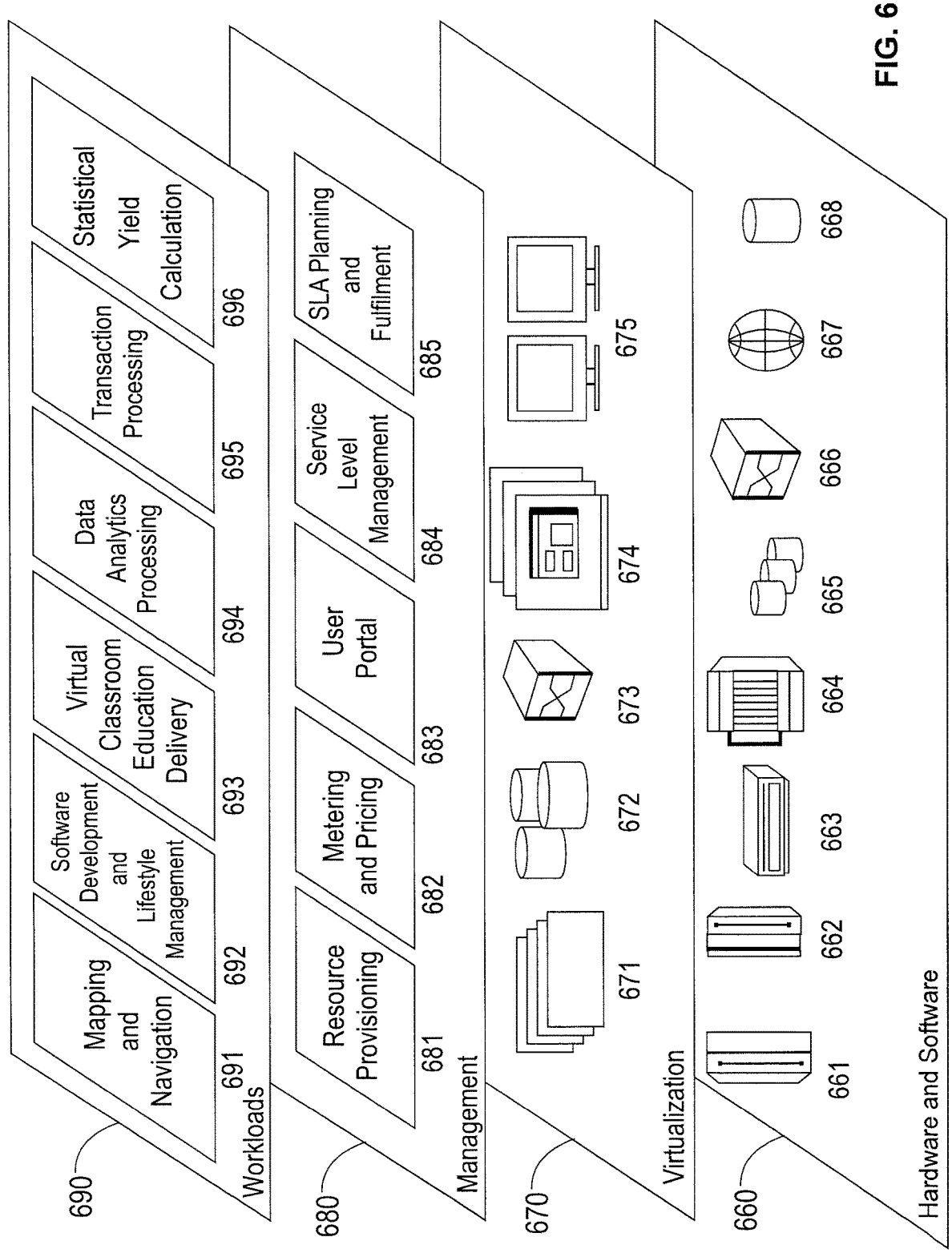
FIG. 6 shows an exemplary set of functional abstraction layers provided by the cloud computing environment shown in FIG. 5, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and statistical yield calculation 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer program product for failure prediction of a batch of manufactured objects, the computer program product comprising a computer readable storage medium having program instructions embodied therewith, the program instructions executable by a computer to cause the computer to perform a method comprising:
   receiving the batch of manufactured objects for the failure prediction by coupling the batch of manufactured objects to the computer;
   generating manufactured object sample classifications for the batch of manufactured objects comprising integrated circuits by training, by the computer using a simulation, a K Nearest Neighbor (K-NN) classifier by classifying a set of samples with uniformly distributed parameter values using a NN-based classification approach and NN vector space;
   determining a centroid of failing ones of the samples in the set, based on the manufactured object sample classifications, the centroid being a geometric mean of the failing ones of the samples in the set;
   generating a new set of samples with a distribution around the centroid of the failing ones of the samples in the set, the new set of samples relating to the batch of manufactured objects;
   populating the NN vector space using the new set of samples;
   classifying, using the trained K-NN classifier, the new set of samples by performing a nearest neighbor search on the nearest neighbor vector space using a distance metric and
   assigning weights to each of the samples in the new set based on shifted sampling locations relative to the centroid using an inherited weight scheme when a number of neighbors is equal to one and using a voting scheme when the number of neighbors is odd and greater than one; and
   selectively accepting or physically discarding the batch of manufactured objects based on a failure probability estimate generated for the batch of manufactured objects, the failure probability estimate based on classifications for the new set of samples.

2. The computer program product of claim 1, wherein said generating step uses mixed importance sampling to reduce classification variation by shifting a sampling location to the centroid of the failing ones of the sample in the set.

3. The computer program product of claim 2, wherein the mixed importance sampling selectively drives an accuracy of and a speed in generating classifications for the new set of samples.

4. The computer program product of claim 1, wherein said classifying step comprises weighing respective contributions of the new set of samples by the distance metric.

5. The computer program product of claim 1, wherein each of the samples in the new set of samples is weighted by a value of 1/d, where d is a distance from a given one of the samples to the centroid.

6. A computing system, comprising:
   a processor and a memory operably coupled to the processor, configured to
      receive a batch of manufactured objects for failure prediction by coupling the batch of manufactured objects to the processor;
      generating manufactured object sample classifications for the batch of manufactured objects by training a K-NN classifier by classifying, using a simulation, a set of samples with uniformly distributed parameter values;
      determine a centroid of failing ones of the samples in the set, based on the manufactured object sample classifications, the centroid being a geometric mean of the failing ones of the samples in the set;

generate a new set of samples with a distribution around the centroid of the failing ones of the samples in the set, the new set of samples relating to the batch of manufactured objects comprising integrated circuits;

populate the NN vector space using the new set of samples; and classify, using the K-NN classifier the new set of samples by performing a nearest neighbor search on the nearest neighbor vector space using a distance metric and assigning weights to each of the samples in the new set based on shifted sampling locations relative to the centroid using an inherited weight scheme when a number of neighbors is equal to one and using a voting scheme when the number of neighbors is odd and greater than one; and selectively accept or physically discard the batch of manufactured objects based on a failure probability estimate generated for the batch of manufactured objects, the failure probability estimate based on classifications for the new set of samples.

7. The computing system of claim 6, wherein at least a portion of the system is comprised in a cloud configuration.

8. The computing system of claim 6, wherein said classifying step comprises weighing respective contributions of the new set of samples by the distance metric.

9. The computing system of claim 6, wherein each of the samples in the new set of samples is weighted by a value of 1/d, where d is a distance from a given one of the samples to the centroid.

* * * * *